June 5, 1962 J. W. BLAIN 3,038,117
PNEUMATIC SOCKET DEVICE FOR VIBRATION TESTING
Filed Nov. 9, 1959 2 Sheets-Sheet 1
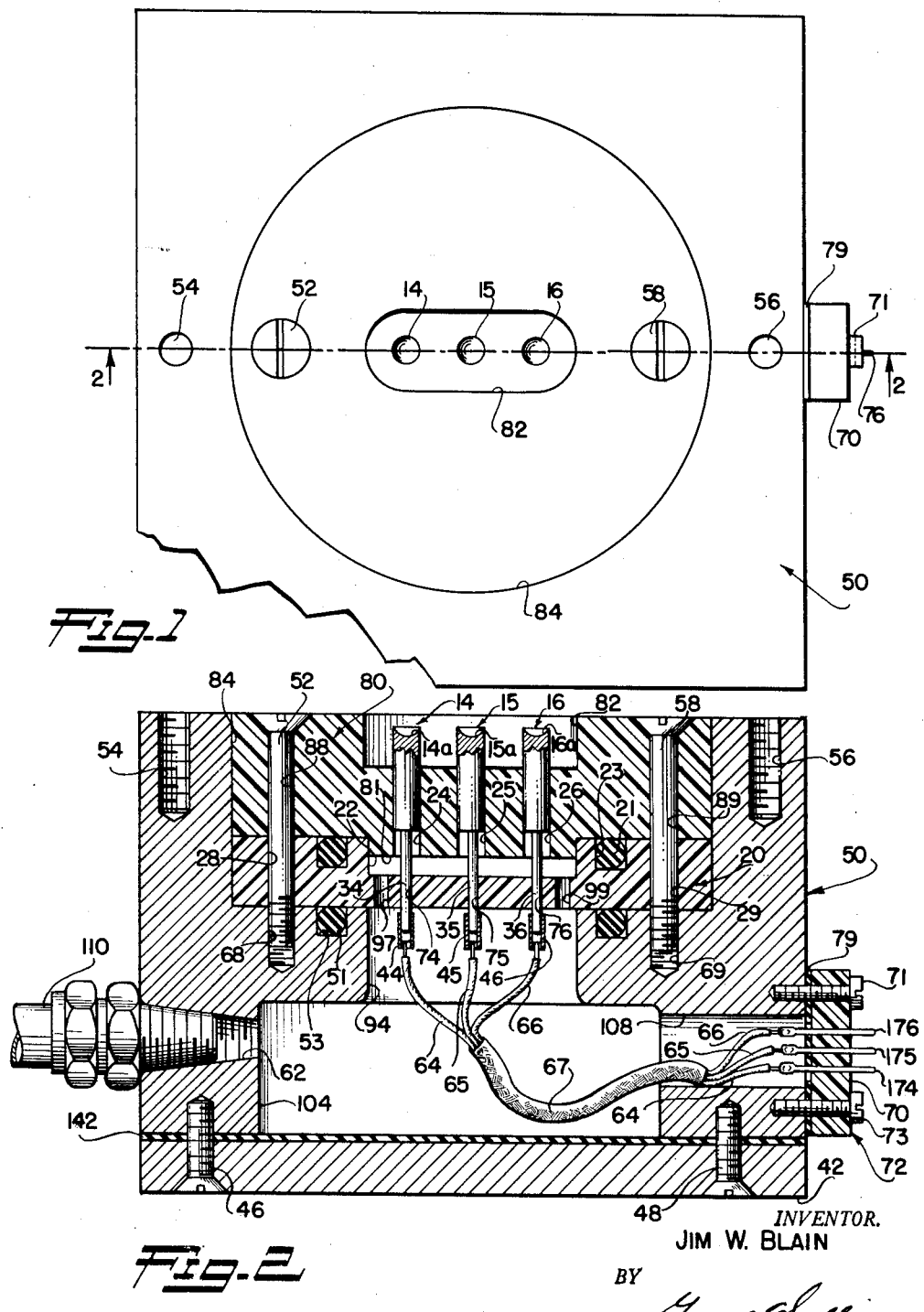
INVENTOR.
JIM W. BLAIN
BY
George C Sullivan
Agent

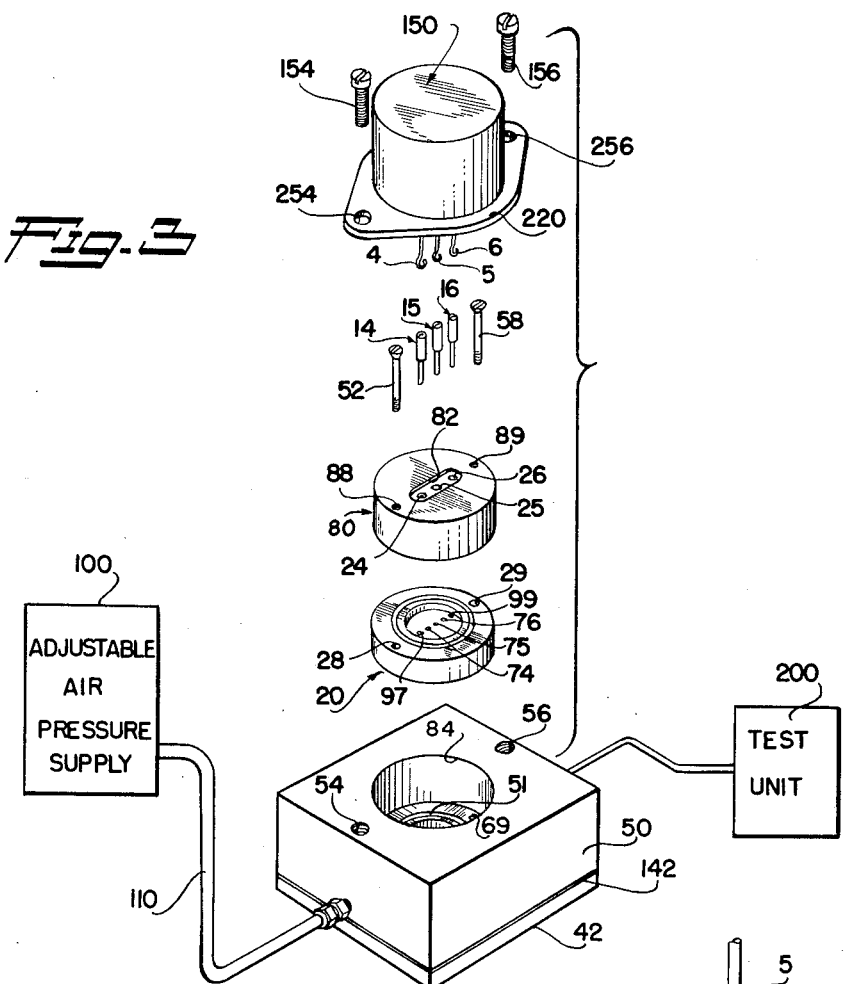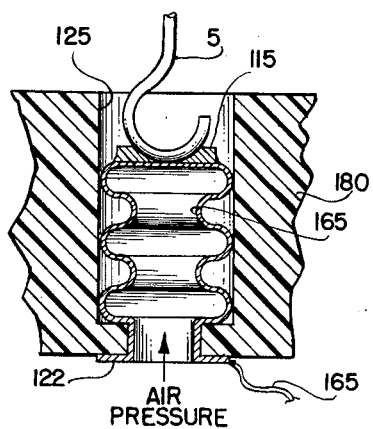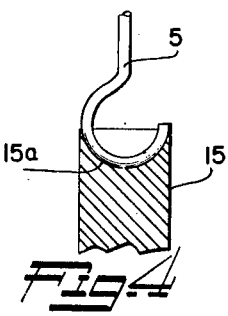

United States Patent Office 3,038,117
Patented June 5, 1962

3,038,117
PNEUMATIC SOCKET DEVICE FOR VIBRATION TESTING
Jim W. Blain, San Jose, Calif., assignor to Lockheed Aircraft Corporation, Burbank, Calif.
Filed Nov. 9, 1959, Ser. No. 851,564
3 Claims. (Cl. 324—28)

This invention relates generally to vibration testing apparatus, and more particularly to improved means and methods for electrically connecting electrical components for vibration testing.

The need for vibration testing of electrical components or devices has taken on new importance as a result of the rugged environments in which these components and devices are required to perform in present day applications, such as in connection with missile and satellite systems. The vibration testing of electrical components and devices, however, has been found to be a most time-consuming and expensive procedure, stemming from the fact that it is necessary to provide soldered electrical connections between the terminals of the device or component being tested and the test equipment, in order to provide satisfactory electrical connections under vibration conditions. Mechanical connection techniques known to the art have proved entirely unsatisfactory, because under vibration, the electrical connections cannot be maintained without producing chattering, which interferes with the operation of the test equipment being used to determine whether the electrical device or component is operating properly. Although mechanical contacts can be made free from chatter throughout some desired range of frequencies, it has not been possible to prevent chatter throughout all the ranges of frequency and vibration amplitude over which electrical components are presently required to be vibrated.

As a result of the above-mentioned difficulties with mechanical connections, it has become necessary to provide soldered connections between the component or device being tested and the test equipment in order to make sure that reliable electrical connections will be maintained during vibration. Where many units must be vibration tested and each unit has many contacts, which is often the case, it can be seen that the soldering of these connections can be most time-consuming. Also, during soldering delicate components will be unnecessarily heated which may reduce their reliability. In addition, solder may be left on the terminals of the component, resulting in an undesirable solder joint when the component is soldered in the unit in which it will finally operate. The need for soldered connections, therefore, is most undesirable and particularly frustrating when the component or device has terminals which ordinarly would lend themselves to convenient and rapid mechanical connection.

Accordingly, it is the broad object of this invention to provide improved means and methods for rapidly and conveniently making reliable electrical connections to an electrical component or device during vibration testing thereof, without the need for soldered connections.

Another object of this invention is to provide a pneumatic socket device to which an electrical component or device may be connected, in order to provide chatterless electrical connection between the component or device being vibrated and suitable testing apparatus.

In a typical embodiment of the invention, a novel pneumatic device is employed for making electrical connection between the terminals of a relay which is to undergo vibration testing, and test apparatus for determining the performance of the relay during vibration. The pneumatic socket device is provided with pins which are pushed into firm contact with the relay terminals by the action of air pressure applied to the pins, the pins acting in a manner similar to "captive" pistons. Two important characteristics are derived from this pneumatic system which make it possible to prevent chattering of the contacts during vibration testing. First, by the use of air pressure much larger forces can uniformly be applied to the pins to maintain the contacts than is possible by other known arrangements, such as by spring loading the pins. The small spacing ordinarily provided between terminals of an electrical component such as a relay necessarily limits the diameter of the socket pins that can be used, thereby making it practically impossible to obtain the necessary forces needed to prevent chattering by the use of spring loaded pins, or any of the other known arrangements now used in the art. Secondly, while most known mechanical connection arrangements have one or more natural frequencies of vibration within the range over which the device is to be vibration tested, the natural frequency of a pneumatic system can be raised well above the range of vibration frequencies by proper choice of the air pressure applied to the socket pins. Such a pneumatic system, therefore, makes it possible to rapidly and conveniently vibration test electrical devices or components, without the need for soldered connections even over the most severe range of frequencies and vibration magnitudes required in present day applications.

The specific nature of the invention, as well as other objects, uses and advantages thereof, will clearly appear from the following description and from the accompanying drawing in which:

FIGURE 1 is a top view of a pneumatic socket device in accordance with the invention.

FIGURE 2 is a cross-sectional front view taken along the line 2—2 in FIGURE 1.

FIGURE 3 is an exploded perspective view of the pneumatic socket device of FIGURES 1 and 2, showing, in addition, diagrammatic representations of apparatus adapted to operate in cooperation therewith.

FIGURE 4 is a cross-sectional view of a detail of a socket pin showing how it is adapted to receive a relay terminal.

FIGURE 5 is a cross-sectional view in the vicinity of a socket pin showing a modified embodiment thereof in accordance with the invention.

Like numerals designate like elements throughout the figures of the drawing.

Referring now to FIGURES 1–4 of the drawing, a metal supporting structure 50 has a bore 84 in the top face thereof. Generally disc-shaped members 20 and 80, made of insulative material such as nylon, are snugly fitted in the bore 84 as shown in FIGURE 2. The member 80 has a circular projection 81 depending from the bottom end thereof which snugly fits in a recess 22 of the member 20, in order to properly locate the member 80 with respect to the member 20. Screws 52 and 58 hold the members 80 and 20 in the supporting structure 50. The screw 52 passes through hole 88 in the member 80, hole 28 in the member 20, and is screwed in a threaded hole 68 in the structure 50; likewise, the screw 58 passes through a hole 89 in the member 80, a hole 29 in the member 20, and is screwed in a threaded hole 69 in the structure 50. Pressure-tight sealing is provided by means of a rubber O-ring washer 51 in an annular groove 53 in the metal base 50, as shown in FIGURE 2.

The insulative member 80 has an elongated recess 82 in the top face thereof, in which are bored holes 24, 25 and 26, adapted to slidably receive the large diameter portions of socket pins 14, 15 and 16. These pins 14, 15 and 16 have reduced shank portions 34, 35 and 36, respectively, which pass through the recess 22 and holes 74, 75 and 76 in the member 20. The shank portions 34, 35 and 36 extend into a bore 94 in the metal structure 50 beyond the larger bore 84. Sleeves 44, 45 and 46 are force-fitted on one end of each of the shanks 34, 35 and 36, respectively, and electrical lead wires 64, 65 and 66 are soldered inside the other end of the sleeves 44, 45 and 46, thereby making electrical connection with the pins 14, 15 and 16.

Beyond the bore 94 in the metal structure 50 is a wider bore 104 which may be of approximately the same diameter as the bore 84. The electrical lead wires 64, 65 and 66 are conveniently held together in a sleeve 67 and pass through a hole 108 in the side of the bore 104 to be connected to an electrical terminal plug 72 mounted at the side of the metal structure 50. The plug 72 has a body portion 70 of insulative material in which are imbedded terminals 174, 175 and 176, the electrical lead wires 64, 65 and 66 being respectively soldered thereto. Screws 71 and 73 pass through holes in the ends of the body portion 70 of the electrical plug 72 and are screwed into threaded holes in the side of the structure 50, a rubber gasket 79 providing a pressure-tight seal.

In the opposite side of the metal structure 50 is a tapered threaded hole 62 adapted to receive an air hose 110 from an adjustable air supply 100 (FIGURE 3). A base plate 42, which may be the table portion of suitable vibration test apparatus, closes off the lower portion of the metal structure 50. Screws 46 and 48 pass through the cover plate 42 into threaded holes in the structure 50, and a rubber gasket 142 assures a pressure-tight seal.

It should now be evident that the interior space within the structure 50 may be subjected to any desired air pressure. Holes 97 and 99 in the member 20 serve to keep the air pressure in the recess 22 the same as that in the opening defined by the bores 94 and 104. The air pressure from the supply 100 is thus uniformly applied at the shank ends of the large diameter portions of the pins 14, 15 and 16, pushing them upward. The only leakage of air will be along the sides of the large diameter portions of the pins 14, 15 and 16, but this can be reduced to a negligible extent by maintaining close tolerances.

A conventional type of relay 150, as shown in FIGURE 3, has terminals 4, 5 and 6 which curve at their ends, and a connecting clip portion 220 with holes 254 and 256 therein. The relay 150 may be mounted to the pneumatic socket device illustrated in FIGURES 1 and 2 by means of screws 154 and 156 passing respectively through the holes 254 and 256, and being threaded in holes 54 and 56 in the top face of the metal structure 50. This brings the relay terminals 4, 5 and 6 in contact with the pins 14, 15 and 16, which have beveled out portions 14a, 15a and 16a, respectively, substantially matching the curved ends of the terminals 4, 5 and 6 so as to suitably mate therewith. FIGURE 4 shows a detail of the mating of the relay terminals with the pin 15 at the beveled portion 15a.

Each relay to be tested is mounted as illustrated in FIGURE 3, and the air pressure of the adjustable air supply 100 is chosen so that the natural frequency of the pneumatic system is above the frequencies at which vibration testing is to take place. This is most conveniently and rapidly done by merely increasing the air pressure to the value which will produce chatterless pin operation under vibration. Preferably, the proper value of air pressure is determined by a trial run over the entire range of frequency and vibration amplitude. Once this pressure is determined all the relays that need be vibration tested may be run through the tests without the need for further adjustment. The air pressure acts uniformly on each of the socket pins 14, 15 and 16, pushing them into firm contact with the relay terminals 4, 5 and 6, the pins 14, 15 and 16 thereby acting in a manner similar to "captive" pistons.

It is to be understood that the particular embodiment illustrated in FIGURES 1–4 is only exemplary and that various modifications are possible without departing from the scope of this invention. For example, FIGURE 5 shows a modified form of the invention in which a conventional type of bellows 165, having an integral terminal receiving member 115 provided on the top thereof, is used as the pneumatic socket pin. The partially shown insulated member 180 corresponds to the member 80 in FIGURE 2, while the hole 125 corresponds to each of the holes 24, 25 and 26 in which the large diameter portions of each of the pins 14, 15 and 16 are adapted to be slidably received. The open end of the bellows 165 has a flange member 122 connected to the lower face of the insulator member 180 by any suitable cementing means. Electrical connection is made to the terminal formed by the bellows 165 and its integral projection 115 by means of a wire lead 165 soldered to the flange 122. Sidewise movement of the bellows 165 is prevented by its snug fit in the hole 125 of the member 180.

The operation of a typical pneumatic socket pin in an embodiment in accordance with FIGURE 5 may now be understood by realizing that as the air pressure within the belows 165 is increased, the bellows 165 extends longitudinally, pushing against the relay terminal 5 so as to make firm contact therewith. It is thus possible to provide the same chatterless connection as was provided in the pin arrangement described in connection with FIGURES 1–4. The FIGURE 5 embodiment has the advantage, however, in that it makes possible a completely closed system which was not possible in the embodiment of FIGURES 1–4 because of leakage along the sides of the large diameter portions of the pins 14, 15 and 16. In the embodiment of FIGURE 5, therefore, very large air pressure forces could be exerted to maintain the connection between the relay terminal and the bellows socket pin, thereby making it possible to operate the system satisfactorily even at very large magnitudes of vibration, far in excess of those now required today.

Although a relay is illustrated as the electrical component to be vibration tested in the embodiments described, it is to be understood that the invention may be applied to many other types of electronic components or devices in a similar manner. The receiving portions of the socket pins would, of course, then be constructed to receive the particular terminals of the device being vibration tested. Also, although air pressure is used in the embodiments described, other fluid pressures may be used.

It should thus be apparent that the embodiments shown in the figures of the drawing are only illustrative, and that various modifications can be made in construction and arrangement within the scope of the invention as defined in the appended claims.

I claim as my invention:

1. In combination with a test unit and an electrical device to be vibration tested having at least one terminal, a pneumatic socket device for making a substantially chatterless electrical connection between said test unit and said terminal comprising means for rigidly connecting said electrical device to said pneumatic socket device, at least one socket pin having a beveled-out portion in one longitudinal end thereof adapted to receive said terminal in contact therewith, means supporting said pin so that it will be slidably movable only in the direction of said terminal, means for applying a fluid pressure to said socket pin to push the beveled-out portion of said pin in contact with said terminal, and an electrical lead connected to said pin and said test unit for making electrical connection therebetween.

2. The combination of a test unit, an electrical device to be vibration tested having a plurality of terminals, and a pneumatic socket device for making substantially chatterless electrical connections between said terminals and said test unit, said pneumatic socket device comprising a supporting structure, means rigidly connecting said electrical device to said supporting structure, a plurality of socket pins in said structure adapted to respectively receive said plurality of terminals in contact therewith, means in said structure restraining said pins so that they will be slidably movable only in the direction of said terminals, an adjustable fluid pressure supply, said structure having a substantially pressure-tight cavity communicating between said pins and said fluid pressure source, the fluid pressure pushing each pin in contact with a terminal of said electrical device, and electrical leads connected between said pins and said test unit for making electrical connection therebetween, the magnitude of the fluid pressure in said cavity being chosen sufficiently large to prevent chatter between said pins and said terminals during vibration testing of said electrical device.

3. The combination of a test unit, an electrical device to be vibration tested having at least one terminal, and a pneumatic socket device for making a substantially chatterless electrical connection between said terminal and said test unit, said pneumatic socket device comprising means rigidly connecting said electrical device to said pneumatic socket device, at least one socket pin comprising a bellows structure having an integral terminal receiving member provided on the top thereof adapted to receive said terminal, means applying fluid pressure within said bellows structure, means supporting said bellows structure so that it is restrained from sidewise movement and upon increase in the fluid pressure therein longitudinally extends in the direction of said terminal causing said integral terminal receiving member to push against said terminal, and an electrical lead connected between said socket pin and said test unit for making electrical connection therebetween, the magnitude of said fluid pressure being chosen sufficiently large to prevent chatter between said pin and said terminal during vibration testing of said electrical device.

References Cited in the file of this patent

UNITED STATES PATENTS

| | | |
|---|---|---|
| 1,316,415 | Brown | Sept. 16, 1919 |
| 1,394,057 | Woernley | Oct. 18, 1921 |
| 1,422,241 | Tomlinson | July 11, 1922 |
| 1,595,862 | Doyle | Aug. 10, 1926 |
| 2,230,277 | Volker et al. | Feb. 4, 1941 |
| 2,586,125 | Van Blarcom | Feb. 19, 1952 |
| 2,636,068 | Perkins | Apr. 21, 1953 |
| 2,954,521 | McKee | Sept. 27, 1960 |

OTHER REFERENCES

Tele-Tech & Electronic Industries, August 1956, pages 68 to 70 and 113.